Aug. 16, 1938.    H. LEDWINKA    2,127,411
MOTOR VEHICLE
Filed Dec. 8, 1936

Inventor
Hans Ledwinka
By B. Singer, atty.

Patented Aug. 16, 1938

2,127,411

UNITED STATES PATENT OFFICE 2,127,411

MOTOR VEHICLE

Hans Ledwinka, Morava, Czechoslovakia

Application December 8, 1936, Serial No. 114,850
In Czechoslovakia December 24, 1935

4 Claims. (Cl. 180—55)

The present invention relates to a motor vehicle with a central longitudinal chassis member and in which a casing containing driving mechanism (for example the engine or gearbox) forms a section of the central chassis member connecting the axles together.

It is already known in such vehicles to so connect by flanges in an overhung manner to the central chassis member, the engine or the change-speed gear or another part of the driving mechanism, that this part can be removed without disturbing the connection between the front and the rear wheels.

With this construction, it has however not been possible to remove a casing forming a section of the central chassis member between the axles and containing driving mechanism, generally the change-speed gear, without the connection between the front and the rear wheels being disturbed. This fact has always been found troublesome since at times repairs are also necessary to the change-speed gear and this requires an overhauling from time to time and, on the other hand, the dismantling of the gear with the existing construction has been found difficult, tedious and costly.

According to the invention, the said drawbacks of the known constructions are avoided in that the casing containing the driving mechanism is arranged between two sections of the central chassis member between which there is provided an auxiliary connection carried round the said casing in such a manner that the casing can be removed whilst maintaining the connection between the front and rear axles.

A further feature if the invention consists in the casing containing driving mechanism being connected between a short wheel-carrying section and another section of the central chassis member. For the auxiliary connection between the central chassis member sections located on the two sides of the casing containing driving mechanism, the carriage body may be used. The pair of wheels and in particular the front wheels are, according to a feature of the invention, mounted on a ring-shaped section of the central chassis member, the engine being connected by flanges to this ring on one end, and the gear casing being connected by flanges to this ring on the other end, one of these parts projecting in overhung manner beyond the connection between the front and rear wheels.

Details of the invention and further features are shown by the example illustrated diagrammatically by the annexed drawing and described below.

Figure 1:
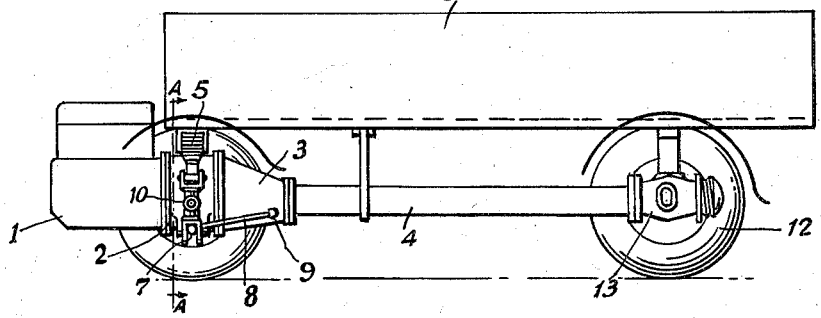
Fig. 1 shows in side view a motor car chassis, the wheels on the left side of the vehicle being omitted for convenience of illustration.
Figure 2:
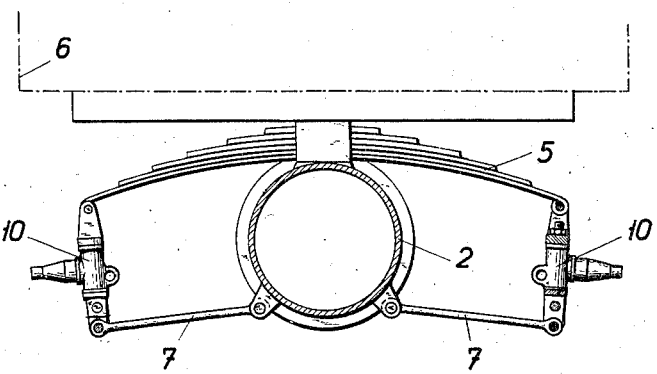
Figure 2 shows the section of the central chassis member serving for the support of the front wheels, in section on the line A—A of Figure 1, and also the axle parts connected therewith.
Figure 3:
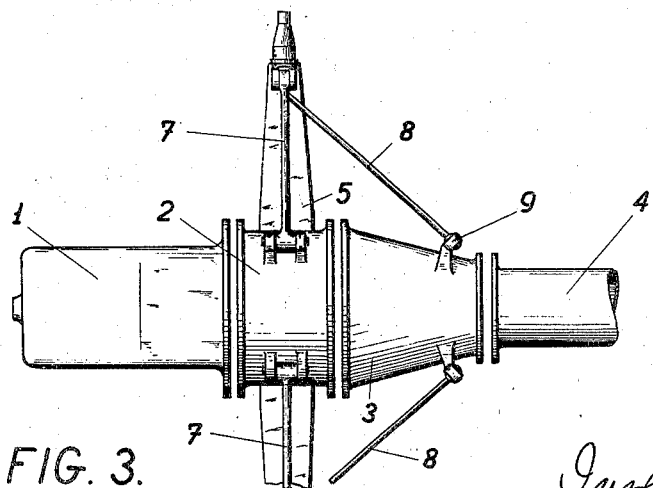
Figure 3 shows the parts of Figure 1 seen from below.

In the example shown, an engine 1 is attached to a ring-shaped casing 2. To the casing 2 is connected on the other side a change speed gear casing 3 and to this again a tube 4. The casings 2, 3 and the tube 4 form sections of the central chassis member of the vehicle connecting the axles together. On the ring-shaped casing 2 is fixed a transverse spring 5 serving for the support and guidance of the front wheels and the front end of the carriage body 6. For holding and guiding the front wheels 11, there are furthermore provided links 7 attached to the part 2, oblique struts 8 which are connected by ball joints 9 on the gear case 3, and axle limbs 10.

As can be seen, radial flanges are provided on the engine 1, the casings 2 and 3 and the tube 4 for connecting these parts together. By the connection of the casing 2, with the carriage body 6, there is provided an auxiliary but sufficient connection between the part 2 and the rear part of the central chassis member comprising the tube 4, so that the gear case 3 can be removed. The engine can, of course, as with known arrangements, be easily removed. The rear wheels 12 are carried by the rear section 13 to which section the tube 4 is connected.

The invention is not restricted to the embodiment shown. Thus, it can naturally also be used when the engine, together with the change speed gear, is arranged between the axles and the housing of the two forms a section of the central chassis member, or when only the engine is arranged between the axles and the gear is connected in overhung manner to the axle-carrying section. Furthermore, the auxiliary connection need not be formed by the carriage body, but other parts can serve for this, and, if necessary, parts which are only placed in position during the withdrawal of the casing containing driving mechanism. There is, however, always the advantage that the connection between the front and rear wheels is not completely disturbed, and thus the vehicle can be moved in the garage or workshop on its own wheels. Naturally care must be taken that the connections between the individual sections of the central chassis member and also the driving and other parts extending through the different sections are so constructed that they permit a removal of the casing after a slight separation of the two adjacent sections.

I claim:

1. In a motor vehicle, a body, front and rear wheels, a sectional longitudinally disposed chassis member, including a ring-like section, other sections detachably secured to said ring-like section at its respective ends, an overlying transverse spring secured to said ring-like section and to said body, wheel spindle units connected to the ends of said spring, links between said spindle units and said ring-like section, and struts connected to said spindle units and detachably connected to an adjacent one of said other sections, in virtue of all of which such section adjacent the ring-like section can be removed without disturbing the ring-like section, and connections between the body and the front and rear wheels.

2. In a motor vehicle having front and rear wheels, a body supported thereby and connections between the body and the front and rear wheels, a central longitudinal sectional chassis member, constituting a connection between the front and rear wheels, said chassis member including a ring-like section to the ends of which adjacent chassis sections are detachably secured, of wheel axle members one at each side of said ring-like section on which the front wheels of the vehicle are mounted, connections between said ring-like section and said axle members to constitute therewith a unitary structure, a connection between said ring-like section and said body in virtue of which the chassis sections which lie between the front and rear wheels of the vehicle may be removed without disturbing the positions of the front and rear wheels with respect to the body of the vehicle to which the wheels are connected.

3. In a motor vehicle, front and rear wheel-axle assemblies, a central chassis member connecting said assemblies, said central chassis member including a casing containing driving mechanism, and a ring-section forming part of a wheel-axle assembly to which said casing is removably secured, said assembly including limbs having wheel spindles, obliquely running struts detachably connected to said casing and connected to said limbs to brace the same, and an auxiliary connection between the front and rear wheel-axle assemblies, in virtue of all of which said casing can be removed while maintaining a connection between the front and rear wheel-axle assemblies for purposes described.

4. In a motor vehicle, a body, front and rear wheels, a transverse spring pack secured to and beneath the body, a sectional longitudinally disposed chassis structure including a ring-like section to which said spring pack is secured, a motor section removably secured to one end of said ring-like section, a change-speed gear casing removably secured to the other end of said ring-like section, wheel spindles connected to the ends of said spring pack, and carrying the front wheels, connections between the body and rear wheels, and links between said spindles and said ring-like section, in virtue of all of which either the motor section or the change-speed gear casing may be detached from and replaced on the ring-like section separately.

HANS LEDWINKA.